US009104671B2

(12) United States Patent
Weksler et al.

(10) Patent No.: US 9,104,671 B2
(45) Date of Patent: Aug. 11, 2015

(54) AUTOMATIC STORAGE MEDIA CONTENT CATALOGING

(75) Inventors: Arnold S. Weksler, Raleigh, NC (US); Rod D. Waltermann, Rougemont, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/274,901

(22) Filed: Oct. 17, 2011

(65) Prior Publication Data

US 2013/0097171 A1  Apr. 18, 2013

(51) Int. Cl.
*G06F 17/30* (2006.01)
(52) U.S. Cl.
CPC ................. *G06F 17/30058* (2013.01)
(58) Field of Classification Search
CPC .................................................. G06F 17/30058
USPC ................................................ 707/736, 740
See application file for complete search history.

(56) References Cited

U.S. PATENT DOCUMENTS

| 7,882,077 | B2 * | 2/2011 | Gokhale et al. | 707/673 |
| 2006/0080359 | A1 * | 4/2006 | Powell et al. | 707/104.1 |
| 2006/0080471 | A1 * | 4/2006 | Powell et al. | 710/6 |
| 2007/0237037 | A1 * | 10/2007 | Teicher | 369/1 |
| 2008/0294605 | A1 * | 11/2008 | Prahlad et al. | 707/3 |
| 2010/0268735 | A1 * | 10/2010 | Planty et al. | 707/770 |
| 2010/0333116 | A1 * | 12/2010 | Prahlad et al. | 719/328 |

* cited by examiner

*Primary Examiner* — Jorge A Casanova
(74) *Attorney, Agent, or Firm* — John L. Rogitz; John M. Rogitz

(57) ABSTRACT

Described is a technology by which a user is able to determine the content of a storage device, including when the storage device is non-operational. A user may use a device and/or program to provide a wirelessly-read identifier to query a repository that maintains cataloged data for the user's storage device. The query to the repository returns the cataloged data for that storage device in response, which is output to the user and the user knows the storage device's contents. Alternatively, the user may obtain a list of storage devices from the repository, and select one to view its cataloged data. When the storage device is operational, the persistent repository is updated with any changes to keep the cataloged data synchronized with the stored content.

26 Claims, 6 Drawing Sheets

AUTOMATIC STORAGE MEDIA CONTENT CATALOGING

BACKGROUND

The subject matter disclosed herein relates to storage media, and more particularly to identification of content stored on storage media.

Contemporary computer users often have many types of storage media devices, including removable devices such as USB memory keys (flash drives), SD Cards, portable hard drives, laptops and tablets with internal hard drives, and other storage media. This is common for individual and family users, as well as corporate users who may share such devices with similar users.

One of the problems with having multiple storage media devices is that a user often does not know what content is stored on what device. As one example, a user may have files scattered among various USB memory keys. As another example, a user who takes a lot of photographs may have several SD cards, with each card storing a different set of photographs; some of those may have been moved to other storage media.

If a user is not particularly organized, the user is often unable to keep track of which storage device contains some desired piece of content. Currently, the way that a user finds desired content is to physically connect each device to a computer system to view a directory of the content stored on that container, and repeat as needed until the desired content is found. Similarly, if at least one of the devices that may contain the desired content is a laptop computer, for example, the user has to boot up the laptop to see its contents. Such actions can be tedious and time-consuming, and also contribute to device deterioration.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which catalog data is automatically maintained for a storage device in a persistent repository, in which the catalog data corresponds to a state in which the storage device is operational. The repository may be accessed to recall the catalog data, independent of whether the storage device is currently operational, or is non-operational with respect to acting as a storage device. The catalog data may be output to an output device.

In one aspect, an identifier of a storage device may be read by a wireless or other reader, such as a barcode scanner, RFID reader and so forth. The identifier is used to query the repository to obtain the cataloged data.

In another aspect, the repository may be accessed with a program that queries the repository with a user-provided request or the like. In response, the user may be presented with a list showing a plurality of the user's storage devices. The user may interact with the list to select a selected storage device from among the plurality, and view that selected storage device's cataloged data.

At a time when the device is operational with respect to acting as a working storage device, the catalog data in the repository for that device may be updated in response to any change to stored content. A new or previously unknown device may be registered in the storage device in the repository, which may include a friendly name and/or other user-provided data.

In one example embodiment, a system comprises a repository of storage device catalog data and a program. The repository may be in the cloud. Alternatively, at least part of the repository may be locally maintained. Independent of whether the storage device is currently operational, a user may interact with the program to obtain the cataloged data for a given storage device. This may be accomplished by providing an identifier read from the storage device, or by requesting a list of storage devices and interacting with that list to view the cataloged data of a selected one.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically cataloging data representative of storage media content in a persistent repository, generally whenever the storage media device is operational, e.g., coupled to a computer system or running on a computer system. Thereafter, when a user is seeking a piece of content or is in possession of a given storage media device, the user can access the repository to know the contents of a given device, independent of whether the device is currently operational, e.g., without needing to physically connect the device to a computer system. As used herein, "non-operational" refers to the inability to access a storage device's content for virtually any reason, including that the storage device is decoupled from any computer system, is not powered up, is sleeping, is non-spinning, is dormant, is damaged, is undesirably slow, and so forth; "operational" refers to having at least read access.

For example, a user can determine the contents of a storage media device by providing an identifier (such as an RFID tag or barcode) associated with the storage device to a computer system or other device (such as a smartphone) that accesses the repository and displays the cataloged data for that device. Alternatively, the user may use a program to access the repository to view a list of devices registered for that user, along with information that helps the user to select a correct device (or narrow down to a subset) from among possibly many devices in from the list.

It should be understood that any of the examples herein are non-limiting. For example, the technology described herein applies to any device capable of storing data, in any format, including devices that are not yet commercially available. Non-limiting examples include flash memory devices such as USB keys, SD cards, smartcards, appliances (e.g., televisions and refrigerators), digital video recorders, digital picture frames, hard disk drives, music players, tablet devices, personal computers, automobile-based storage devices, smartphones, landline phones with storage, GPS devices, gaming systems and components, and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data storage and retrieval in general.

Figure 1:
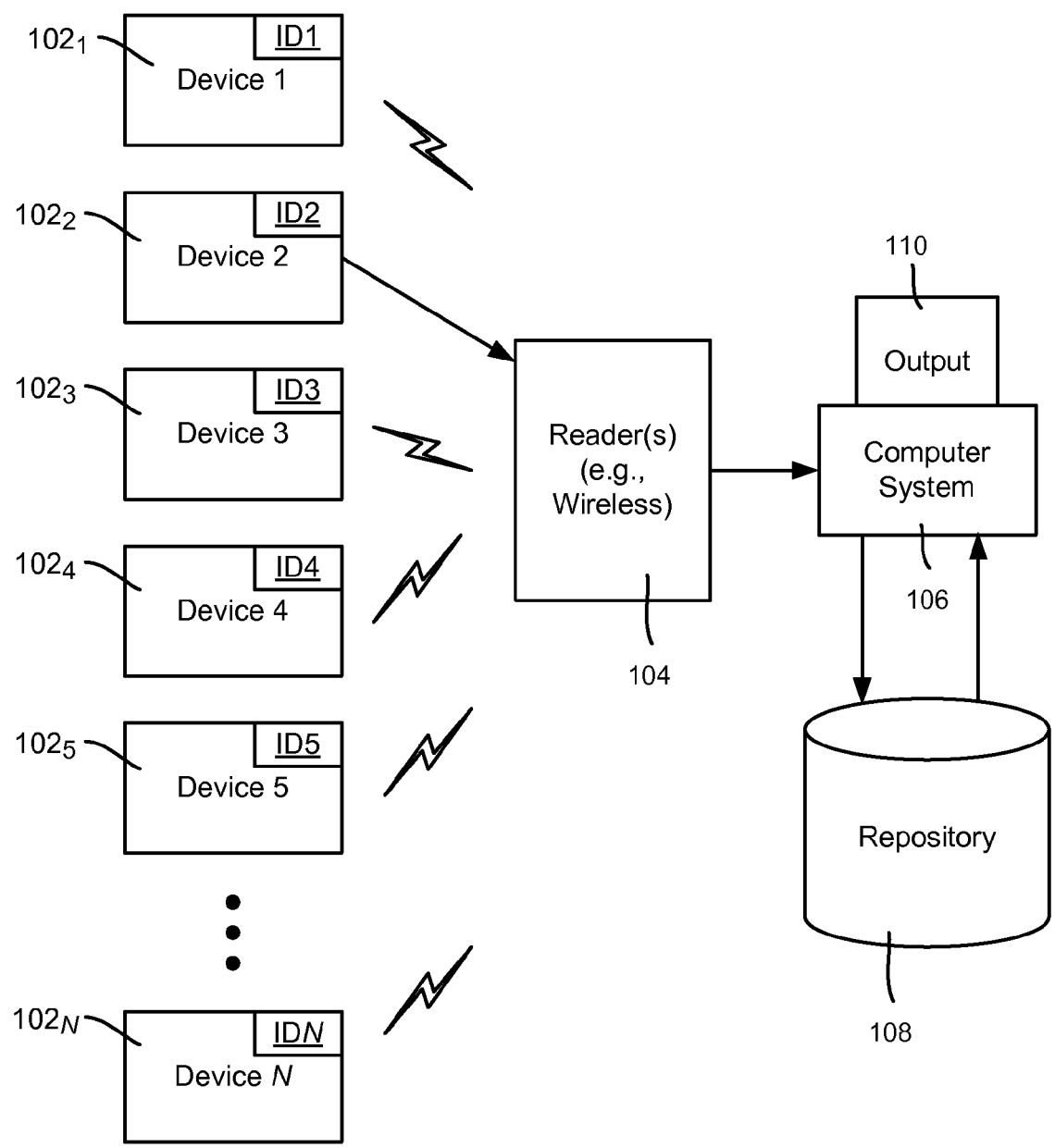
FIG. 1 is a block diagram showing an example embodiment comprising storage devices that may be identified via a wireless reader mechanism including when the storage devices are non-operational.

FIG. 1 is a block diagram representing a plurality of storage media devices $102_1$-$102_N$ that are associated with a user or group of users. Each device has a respective device identifier ID1-IDN, which in this example, is capable of being read by some corresponding mechanism, shown in FIG. 1 as at least one reader 104. Example identifiers include barcodes, QR codes, RFID-tags, near field communication mechanisms, or other contactless-sensed proximity identifiers, and the like (such as alphanumeric values capable of being optically recognized). The identifiers are unique to an extent, at least unique within a given system for a given user. For example, a device identifier may be unique on its own within a system, or unique when combined with a user identifier in a way that provides a unique combined user-device identifier within a system.

Example readers including barcode scanners or cameras, QR code scanners or cameras, RFID readers, and so forth. A reader may also be something to which the device physically connects, e.g., a memory card (e.g., Device 2 ($102_2$)) may be plugged into a reader that obtains the memory card's identifier, independent of whether the memory card's storage contents may be read. A phone with a camera may capture and decode a barcode or QR code, for example, as well as use optical character recognition (OCR) to recognize a text label. Shape matching, color matching and so forth may be used to identify a given storage media device. In general, any way that a device can be uniquely identified without needing the device to be operational, e.g., by physically coupling the device to a computer system, or spinning up a hard disk, may be implemented.

By way of example, consider that a user wants to know information regarding storage media Device 4 ($102_4$). The user exposes the device $102_4$ to a suitable wireless reader (represented by reader 104), which in turn provides the device identifier (ID4) to a computer system 106 to which the reader 104 is coupled. Note that while FIG. 1 shows a wireless reader and a computer system as being separate components, it is understood that the reader and computer system may be integrated, such as a smartphone camera-enabled application that acts as the reader, with the smartphone hardware and other software acting as the computer system.

The computer system 106 accesses a persistent repository 108 containing information regarding Device 4 ($102_4$), e.g., indexed by the device identifier ID4 (and possibly a user identifier). As used herein, "persistent" refers to indefinite, non-temporary caching of data, e.g., data that does not expire on its own. As described below, this information may include cataloged information regarding the device contents, e.g., arranged as a hierarchy of folders and files, with accompanying metadata. Other information, such as a friendly device name given by the user to the device (e.g., "blue 2GB USB key"), and/or a brief text description provided by the user (e.g., "contains the wedding photos") may be maintained in the repository 108.

When the information for the identified Device 4 ($102_4$) is retrieved from the repository 108, the computer system may render corresponding output 110 with which the user may interact (e.g., scroll, expand/collapse folders) to determine the device's contents. The friendly name and brief description may also be output. As can be readily appreciated, the user thus obtains information regarding the cataloged content for a storage device independent of whether the device itself is operational, e.g., without having to physically couple the device to a computer system or spin up a hard disk/start up a flash memory device.

In one embodiment, the repository is located remotely, e.g., "in the cloud" and accessed through a cloud-based program (e.g., cloud service or application), whereby the user may obtain the information from any suitable location that has network access. The internet and/or an intranet are thus alternatives for the repository's location. Local storage is also an alternative; for example a smartphone-based repository (which may be the user's only repository or a synchronized replica of another repository) is another alternative suitable for some users, because many users tend to carry their phones with them and have them turned on, whereby a user can quickly locate the desired information regardless of whether the user has a nearby computer system with a remote network connection. A smartphone-based repository, in conjunction with a storage device being updated on a different computer system, may be synchronized via a Bluetooth® or USB connection, wireless internet connection, 3G or 4G networking connection, or the like.

Thus, as used herein, a "storage device" may comprise any electrically isolated storage medium or media, including whether incorporated into a single storage entity or as a component of a larger storage entity. For example, one storage device may be part of a personal computer or tablet that is able to be operated to access a repository independent of whether another storage device of that same computer (e.g., a hard drive) is currently operational. As a more particular example, Lenovo® produces a computer system that is capable of operating in a low power state; the repository may be maintained and viewed in this state via one storage device of the computer system while another storage device of the same computer system is non-operational. As another example, a solid-state storage unit may include a repository on one storage device that is capable of being accessed independent of whether another, electrically isolated storage device of the same physical storage unit is operational or non-operational.

Figure 2:
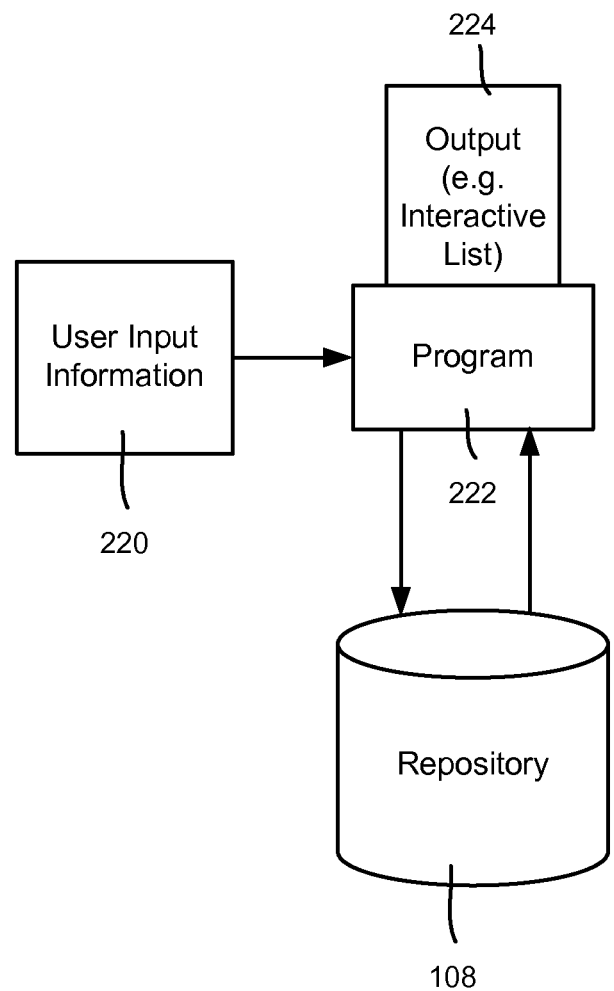
FIG. 2 is a block diagram showing an example embodiment comprising access by a program to a repository of cataloged storage device data to provide an output related to the cataloged storage device data.

FIG. 2 shows another usage model in which a user inputs information 220 regarding cataloged content, without needing to provide the device identifier. For example, a user may request that a list of devices registered for that user be returned from the repository 108, such as a list of friendly names. The user may then interact with the listed devices to see what information is cataloged for each device. A user may also input a previously entered friendly name (e.g., "red 4GB USB key") to get the cataloged data for that particular device, (or two or more devices if more than one have the same friendly name).

By way of example, consider that a user has several storage media devices in front of him or her and cannot remember which one contains a file that the user needs. The user may interact with a software program 222 to request a list 224 of the user's registered devices, which the computer program returns by accessing the repository 108. The user may interact with the list, for example, to expand a device listing and look for content such as in a file-system like directory, and/or search for desired content among the full set of listed devices, e.g., by filename, keyword or keywords (if cataloged), date, size or any other cataloged metadata. Note that a user may have a file stored in more than one device, whereby the search may identify each device that contains the file (as well as possibly other information such as the folder path or paths to each file instance). The user may also look for any cataloged text accessed via the program (e.g., "this device contains the wedding pictures") to help determine a device.

Continuing with the above example, when the desired content is located, the user is able to view other information regarding the device to determine the exact device that is desired, or at least narrow the desired device down to a smaller subset in some way. For example, the friendly name that the used had previously entered may be viewed, such as "Lenovo laptop", and if the user only has one such device, then that one is known to contain the file, at least to a very high probability. The returned friendly name is not necessarily unique, e.g., "1GB SD card" may apply to two or more devices, however from the name the user at least knows the desired file is on one of his or her 1GB SD cards and not on a USB key, laptop, desktop PC, or tablet.

With respect to security, the user may specify on a per-device, per-folder and/or per-file basis that credentials are needed to view the cataloged data. Security may be automatic, e.g., if a device or folder is encrypted, then the cataloged data is protected in some way.

A device (or portion thereof such as a folder) may have its cataloged data shared by associating the device with multiple user and/or group identifier or identifiers. For example, in a laboratory environment where storage devices are shared among researchers, any of the researchers may be able to access the repository and view the cataloged data for those storage devices.

Another scenario where access to the catalog is useful is with respect to determining whether a device needs to be destroyed or can be discarded. By way of example, consider a storage device that is damaged in some way. Although the device owner may not be able to connect the device to read its contents, some of the data may still be accessible, such as via forensic tools. By viewing the cataloged data in the repository, the device owner can efficiently determine whether the device contains sensitive data and thus is to be destroyed, or only contains non-sensitive data and may instead be discarded without concern.

Figure 3:
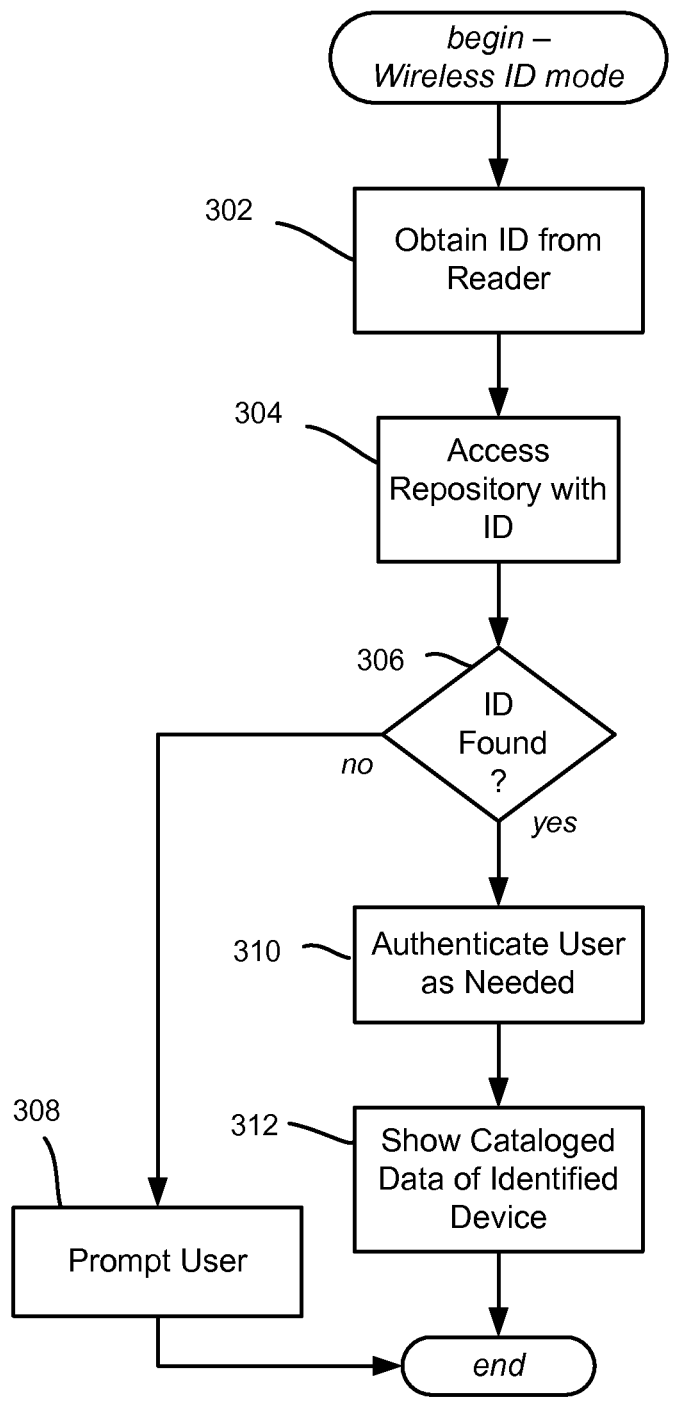
FIG. 3 is a flow diagram representing example steps that may be taken by a computing device in one embodiment to obtain cataloged data for a storage device, independent of whether the storage devices is currently non-operational.

FIG. 3 is a flow diagram showing example steps that may be taken by a computer system or the like in one embodiment when the computer system obtains a device identifier from a wireless reader (step 302) for the purpose of seeking cataloged information regarding the device associated with that identifier. Step 304 accesses the repository with the identifier, which as described above may be unique to the repository, or unique for that user.

Step 306 evaluates whether the device ID is found in the repository. If not, the device is likely a new device (or the ID was incorrectly read, such as if a barcode sticker on the device is damaged). If not found the user is prompted (step 308) to take other action, such as to register the device and catalog data regarding that device.

If the device ID is found at step 306, step 310 represents taking some action to ensure that the user is authorized to see the content, if appropriate. For example, if the user has protected the storage media device with encryption, then the encryption key or some suitable credentials may be needed to view the cataloged content. Note that authorization may take place at another time, such as before accessing the repository. For example, a large repository in the cloud may need the user pre-authenticated to more efficiently find that user's set of device identifiers, and may not consume resources to find information for a device ID until the user is authenticated.

After any needed authentication is complete, step 312 displays the cataloged data for this device identifier to the user. As can be seen, the user is able to view the contents cataloged for that device without having to actually couple the device to a computer system or otherwise access/energize the device.

Figure 4:
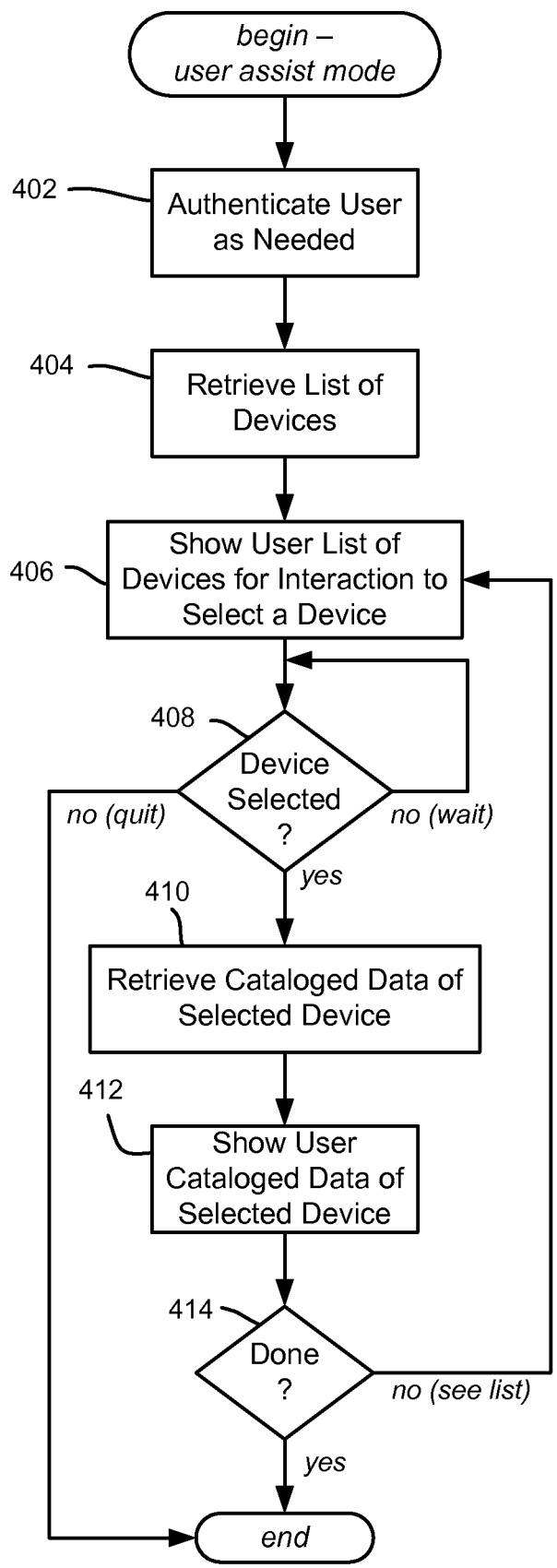
FIG. 4 is a flow diagram representing example steps that may be taken by a computing device in one embodiment to obtain a list of storage devices for user-selection to view the cataloged storage device data of a selected device.

FIG. 4 is a flow diagram showing example steps that may be taken by a computer system or the like in one embodiment when a user wants to see or interact with the cataloged information for the user's devices. Step 402 represents authenticating the user as needed. For example, with a cloud-based service, a user needs credentials to ensure that the user does not access another user's data. However, for a personal smartphone-based repository, the user may not need credentials, other than perhaps the PIN needed to access the phone's resources in general. Note that even with authentication, a user may need addition information such as a key to decrypt cataloged information corresponding to an encrypted storage device or folder thereon. For purposes of simplicity, it is assumed in FIG. 4 that no such further information is needed, or is provided as needed to the computer program.

Step 404 represents retrieving a list of the user's devices. This may be a list of each registered device the user has, however depending on filtering information the user may have provided the program, this list may be of a subset of the user's registered devices, such as only the devices of type USB keys (if known to the system).

Step 406 represents showing the list. At this time the user may interact to select a device, perform a search to find a device (or smaller subset) for selection, and so forth. Step 408 represents waiting until a device is selected or the user quits the program.

If a device is selected at step 408, step 410 represents retrieving the cataloged data of the selected device. The retrieval may be from the repository, and/or from a cache of data downloaded from the repository in advance; e.g., caching may be performed as part of step 404 to facilitate efficiency, particularly if the cataloged data is relatively small. Note that similarly, any search for content (e.g., at step 406) may be performed by querying the repository and/or by searching the cache if at least some of the data is cached.

Step 412 represents showing the user the cataloged data for the selected device. At this time, the user may end the process, such as because the desired content has been determined to be on a particular device, or return to step 406 for further interaction, e.g., to view the cataloged data of a different device.

Figure 5:
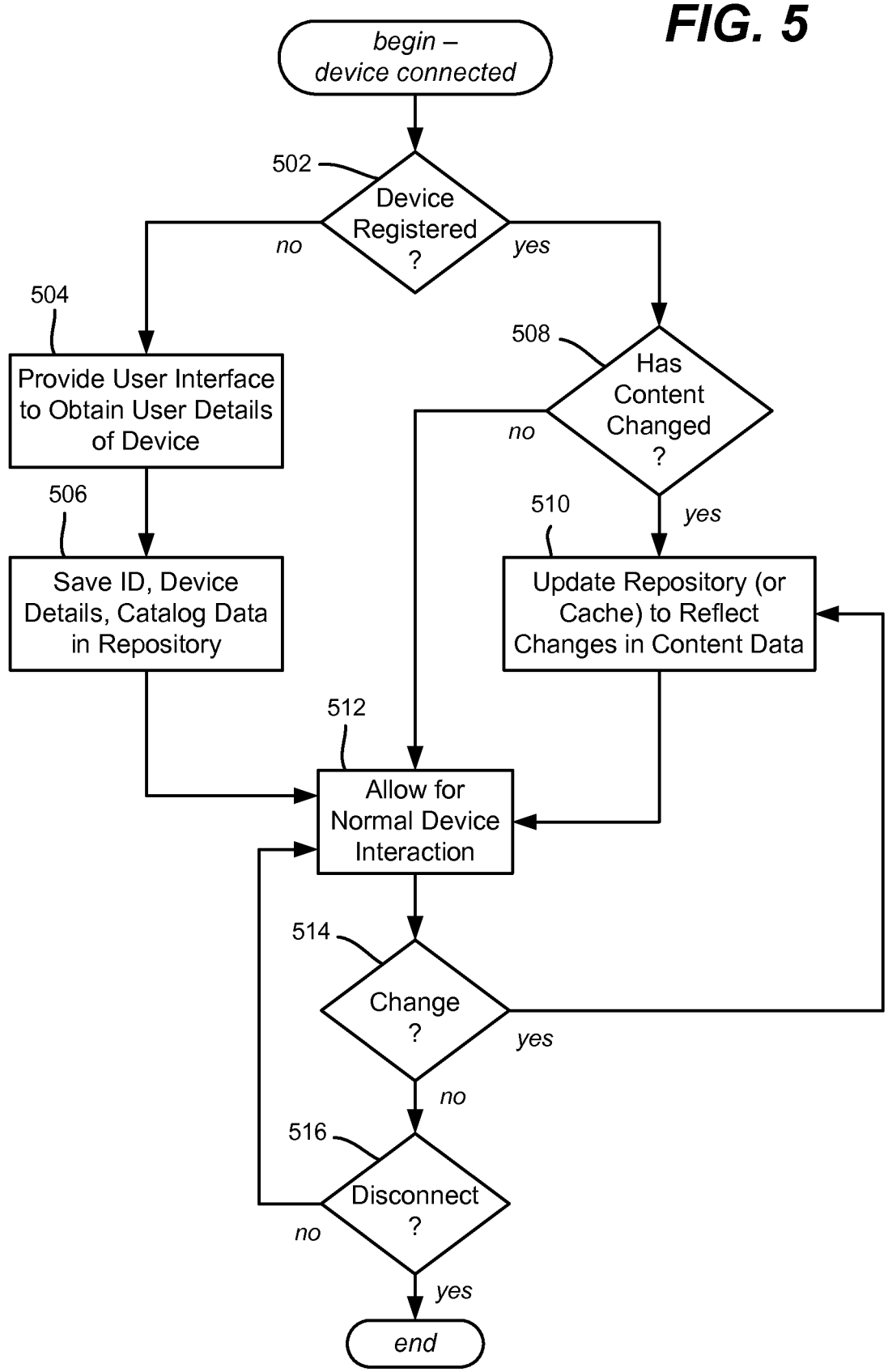
FIG. 5 is a flow diagram representing example steps that may be taken by a computing device in one embodiment to upload catalog data for a storage device to a cache and/or repository, at a time that the storage device is currently operational.

FIG. 5 is directed to a scenario, represented by example flow diagram steps that may be taken by a computer system or the like in one embodiment, in which a storage media device is physically connected to a computer. Step 502 evaluates whether the device is previously known to the system, and thus has information cataloged in the repository; note that contemporary storage devices have unique identifying information such as a device GUID that the computer system can read when the device is connected, (and if different from the device ID read by the reader, is able to be related by the computer system and the related IDs maintained in the repository).

If not already known, step 502 branches to step 504, which provides a user interface directed to having the user to register the device. For example, if the user wants to register the device, the user may give the device a friendly name and a brief text description, as exemplified above. The user may also use a device ID reader to enter the device ID that may be wirelessly read, as described above with reference to FIGS. 1 and 3. Note that a new device need not have its ID read externally for initial registration, if the device internally includes the same ID information in a manner that is accessible to the computer system. The user may also provide security-related information as well, e.g., parameters and credentials.

Step 506 represents saving the cataloged data such as device ID, device details (e.g., friendly name, text description, and device GUID if different from the device ID that is externally read) and any other cataloged information in the repository. The device is now registered. Note that the cataloged data may be mostly empty for a new device, however the device may be an older device that had content stored thereon from an earlier time, before registration, and thus the cataloged data may be relatively extensive.

If already registered at step 502, step 508 is performed to evaluate whether content has changed since the last time the device was connected to a computer system. For example, the storage device may have been changed on a computer system that was not connected to the repository, and thus the repository needs to be updated at step 510 to re-catalog the current contents. For efficiency, one or more mechanisms may be used to determine if the content has changed, e.g., a hash of the cataloged metadata may be compared with a hash of similar device metadata, a timestamp of the latest change may be compared with the last time the device was cataloged, the master boot record may be analyzed for a change, and so forth.

Step 512 represents allowing for normal user interaction with the device, such as automatically providing an appropriate user interface (UI) that allows a user to interact with the stored content. For example, when a user plugs in a USB key, the computer system may be configured such that an action is automatically performed, e.g., a directory of files pops up. Alternatively, the user may interact to see the available storage volumes, and select the one corresponding to the device to view its content.

Via the UI or other mechanisms (e.g., save a file to the device from a program using a "Save As" mechanism), the user may make changes to the content stored on the device. Any such changes are detected via the file system at step 514 and the repository catalog updated to reflect the changes. Caching and the like may be used to reduce the amount of communication needed to keep the repository catalog updated, e.g., the cache may be kept current and flushed periodically to the repository, or held until the cloud-based service is connected. Thus, at least part of the repository may be temporarily or permanently (e.g., unless and until purposely deleted) maintained on local storage of the user. The updating continues as needed until the device disconnects, as detected at step 516.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 6:
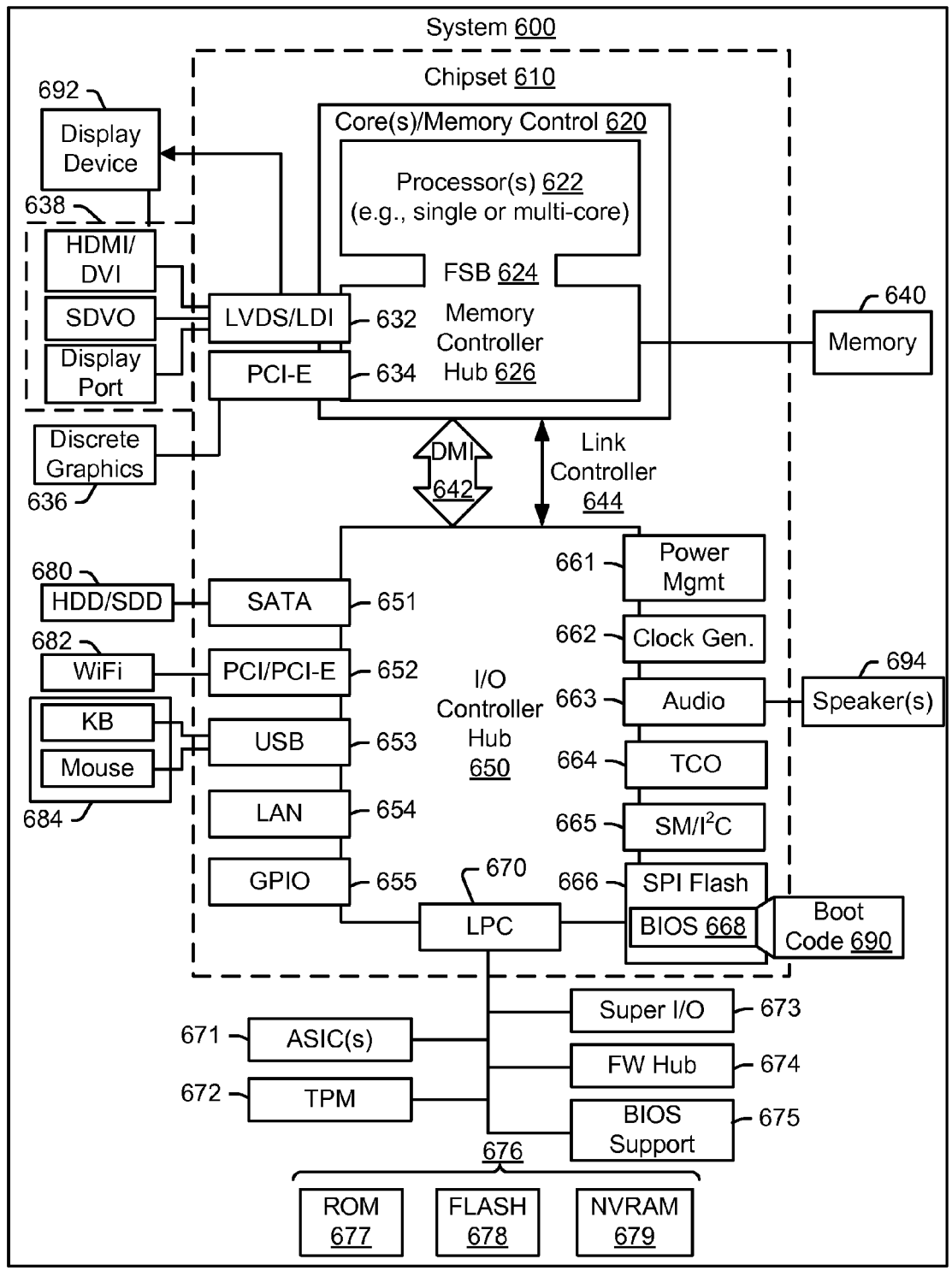
FIG. 6 is a block diagram representing an example computing environment into which aspects of the subject matter described herein may be incorporated.

While various example circuits or circuitry are discussed, FIG. 6 depicts a block diagram of an illustrative example computer system 600. The system 600 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 600.

The system 600 of FIG. 6 includes a so-called chipset 610 (a group of integrated circuits, or chips, that work together, chipsets) with an architecture that may vary depending on manufacturer (e.g., INTEL®, AMD®, etc.). The architecture of the chipset 610 includes a core and memory control group 620 and an I/O controller hub 650 that exchange information (e.g., data, signals, commands, etc.) via a direct management interface (DMI) 642 or a link controller 644. In FIG. 6, the DMI 642 is a chip-to-chip interface (sometimes referred to as being a link between a "northbridge" and a "southbridge"). The core and memory control group 620 include one or more processors 622 (e.g., single or multi-core) and a memory controller hub 626 that exchange information via a front side bus (FSB) 624; noting that components of the group 620 may be integrated in a chip that supplants the conventional "northbridge" style architecture.

In FIG. 6, the memory controller hub 626 interfaces with memory 640 (e.g., to provide support for a type of RAM that may be referred to as "system memory"). The memory controller hub 626 further includes a LVDS interface 632 for a display device 692 (e.g., a CRT, a flat panel, a projector, etc.). A block 638 includes some technologies that may be supported via the LVDS interface 632 (e.g., serial digital video, HDMI/DVI, display port). The memory controller hub 626 also includes a PCI-express interface (PCI-E) 634 that may support discrete graphics 636.

In FIG. 6, the I/O hub controller 650 includes a SATA interface 651 (e.g., for HDDs, SDDs, etc.), a PCI-E interface 652 (e.g., for wireless connections 682), a USB interface 653 (e.g., for input devices 684 such as keyboard, mice, cameras, phones, storage, etc.), a network interface 654 (e.g., LAN), a GPIO interface 655, a LPC interface 670 (for ASICs 671, a TPM 672, a super I/O 673, a firmware hub 674, BIOS support 675 as well as various types of memory 676 such as ROM 677, Flash 678, and NVRAM 679), a power management interface 661, a clock generator interface 662, an audio interface 663 (e.g., for speakers 694), a TCO interface 664, a system management bus interface 665, and SPI Flash 666, which can include BIOS 668 and boot code 690. The I/O hub controller 650 may include gigabit Ethernet support.

The system 600, upon power on, may be configured to execute boot code 690 for the BIOS 668, as stored within the SPI Flash 666, and thereafter processes data under the control of one or more operating systems and application software (e.g., stored in system memory 640). An operating system may be stored in any of a variety of locations and accessed, for example, according to instructions of the BIOS 668. As described herein, a device may include fewer or more features than shown in the system 600 of FIG. 6.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
    automatically maintaining catalog data for a plurality of storage devices in a persistent repository maintained remote from the plurality of storage devices, comprising updating catalog data in the persistent repository for each of the plurality of storage devices while the storage devices are operational for data access;
    receiving, at the persistent repository, a data request for catalog data associated with a first storage device of the plurality of storage devices independent of whether the first storage device is currently operational; and
    outputting at least some of the catalog data associated with the first storage device to a recipient in response to the data request, wherein the data request is received from a reader, and wherein the data request comprises an identifier associated with the first storage device.

2. The method of claim 1, wherein the identifier associated with the first storage device is used in the data request to query the persistent repository for the catalog data associated with the first storage device.

3. The method of claim 1, comprising:
    outputting a list identifying the plurality of storage devices.

4. The method claim 1, comprising:
    detecting a change to at least a portion of catalogued data at a time while the first storage device is operational; and
    updating at least a portion of the catalog data in response to detecting the change.

5. The method of claim 1, comprising:
    entering data pertaining to a new storage device in the persistent repository.

6. The method of claim 5, wherein entering data pertaining to the new storage device in the persistent repository comprises entering in the persistent repository an identifier associated with the new storage device, and maintaining cataloged data in the persistent repository for the new storage device.

7. The method of claim 5, wherein entering data pertaining to the new storage device in the persistent repository comprises entering in the persistent repository a name associated with the new storage device, and maintaining information corresponding to the name in the persistent repository.

8. The method of claim 1, comprising setting respective security attributes for respective catalog data associated with respective storage devices.

9. A method comprising:
    wirelessly reading, with a reader device, identifier data from a storage device;
    sending a request for catalog data that is maintained in a persistent repository, the catalog data associated with the storage device, the request comprising the identifier data that was wirelessly read from the storage device; and
    receiving from the persistent repository the catalog data, wherein the persistent repository is located remote from the storage device.

10. At least one computer readable storage medium that is not a transitory signal and that comprises instructions executable by at least one processor to:
    automatically obtain catalog data from a storage device;
    store the catalog data on a persistent repository located remote from the storage device in association with information that identifies the storage device;
    receive a query at the persistent repository for the catalog data independent of whether the storage device is currently operational, wherein the query identifies the storage device using the information; and
    output at least some of the catalog data to a display mechanism in response to the query, wherein the information is associated with an identifier for the storage device, wherein the query is received at the persistent repository from a reader, and wherein the query comprises the identifier.

11. The at least one computer readable storage medium of claim 10, wherein the automatic obtainment of the catalog data from the storage device comprises detection of a change to the catalog data and wherein the storage of the catalog data on the persistent repository comprises an upload of at least part of the catalog data to the persistent repository.

12. The at least one computer readable storage medium of claim 10, wherein the instructions are executable by at least one processor to:
    receive a query at the persistent repository for indication of storage devices associated with at least one of a user and a group.

13. The computer readable storage medium of claim 10, wherein the persistent repository indicates respective security attributes for respective catalog data associated with respective storage devices.

14. A system, comprising:
    a processor; and
    a memory accessible to the processor and having instructions executable by the processor to:
    store catalog data associated with a storage device in a persistent repository, wherein the persistent repository is located remote from the storage device;
    receive, at the persistent repository, an access request wherein the access request is to access at least some of the catalog data; and
    output at least a portion of the catalog data to a recipient in response to the access request, wherein the access request is received from a reader, and wherein the access request comprises an identifier associated with the storage device.

15. The system of claim 14, wherein the identifier identifies the storage device, and wherein the information is used by the reader to generate the access request.

16. The system of claim 14, wherein the access request is a first access request, and wherein the instructions are executable by the processor to:
    receive second access request at the persistent repository that comprises at least one of a user identifier and a group identifier.

17. The system of claim 16, wherein the storage device is a first storage device, and wherein the instructions are executable by the processor to:
    provide an interactive list, based on the at least one of the user identifier and the group identifier, at which at least a second storage device is selectable; and
    in response to receipt of a selection of the second storage device from the interactive list, access the persistent repository to return information corresponding to catalog data for the second storage device.

18. The system of claim 14, wherein at least part of the persistent repository is one of temporarily maintained and permanently maintained on a local storage of an associated computing device.

19. The system of claim 14, wherein the persistent repository is accessed via a cloud-based program communicatively coupled to at least one computing device.

20. The system of claim 14, wherein the catalog data corresponds to at least one collection of data.

21. The system of claim 14, wherein the persistent repository indicates respective security attributes for respective catalog data associated with respective storage devices.

22. The method of claim 9, wherein the persistent repository indicates respective security attributes for respective catalog data associated with respective storage devices.

23. The method of claim 9, wherein sending the request comprises sending data associated with at least one of a user and a group, and wherein the storage device is associated with the at least one of user and group.

24. The method of claim 9, wherein sending the request comprises sending the request to a cloud computing service.

25. The method of claim 9, wherein the identifier data is wirelessly read using near field communication.

26. The method of claim 1, wherein the identifier is wirelessly read by the reader from the first storage device and included in the data request.

\* \* \* \* \*